United States Patent
Omnes et al.

(10) Patent No.: US 9,774,595 B2
(45) Date of Patent: Sep. 26, 2017

(54) METHOD OF AUTHENTICATION BY TOKEN

(71) Applicant: Orange, Paris (FR)

(72) Inventors: Nathalie Omnes, Trebeurden (FR); Frederic Loras, Versailles (FR); Pascal Belin, Villennes-sur-Seine (FR); Gerald Huet, Trebeurden (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/569,059

(22) Filed: Dec. 12, 2014

(65) Prior Publication Data

US 2015/0172283 A1 Jun. 18, 2015

(30) Foreign Application Priority Data

Dec. 12, 2013 (FR) ...................... 13 62496

(51) Int. Cl.
*H04L 29/06* (2006.01)
*H04W 12/08* (2009.01)

(52) U.S. Cl.
CPC ...... *H04L 63/0853* (2013.01); *H04L 63/0807* (2013.01); *H04L 63/0876* (2013.01); *H04L 63/107* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 6,314,425 B1 * | 11/2001 | Serbinis | .............. G06F 17/3089 707/999.01 |
| 8,251,283 B1 | 8/2012 | Norton | |
| 8,302,167 B2 | 10/2012 | Mennes et al. | |
| 8,392,702 B2 | 3/2013 | Qiu et al. | |

(Continued)

FOREIGN PATENT DOCUMENTS

| | | | |
|---|---|---|---|
| EP | 1544744 A1 | 6/2005 | |
| EP | 1677486 A1 | 7/2006 | |

(Continued)

OTHER PUBLICATIONS

Zargar, Saman Taghavi; Joshi, James; Tipper, David. A Survey of Defense Mechanisms Against Distributed Denial of Service (DDoS) Flooding Attacks. IEEE Communications Surveys & Tutorials. vol. 15, Issue: 4. Pub. Date: 2013. http://ieeexplore.ieee.org/stamp/stamp.jsp?arnumber=6489876.*

(Continued)

*Primary Examiner* — Jeremiah Avery
(74) *Attorney, Agent, or Firm* — David D. Brush; Westman, Champlin & Koehler, P.A.

(57) ABSTRACT

A method is provided for authentication by token for accessing a service from a terminal. The method includes, on receipt of a service access authorization request including at least one unique identifier of the terminal, steps of determining a network access context of the terminal; checking validity of the service access rights, including at least checking an access right associated with the network access context of the terminal; and, if the access rights are valid, generating a valid authentication token on the basis of the unique identifier of the terminal and the network access context, and transmitting the token to the terminal.

12 Claims, 6 Drawing Sheets

(56) References Cited

U.S. PATENT DOCUMENTS

| | | | |
|---|---|---|---|
| 8,406,738 B2 | 3/2013 | Harada et al. | |
| 8,572,689 B2* | 10/2013 | Radhakrishnan | G06F 21/335 726/2 |
| 8,966,599 B1* | 2/2015 | Barrows | H04L 63/08 705/37 |
| 9,032,217 B1* | 5/2015 | Brandwine | G06F 21/44 713/185 |
| 2003/0105810 A1* | 6/2003 | McCrory | H04L 29/06 709/203 |
| 2004/0123159 A1* | 6/2004 | Kerstens | H04L 12/24 726/12 |
| 2007/0136603 A1* | 6/2007 | Kuecuekyan | G06F 21/6218 713/185 |
| 2008/0242264 A1 | 10/2008 | Malik et al. | |
| 2009/0132813 A1* | 5/2009 | Schibuk | G06Q 20/223 713/158 |
| 2009/0228963 A1 | 9/2009 | Pearce et al. | |
| 2010/0251353 A1* | 9/2010 | Hodgkinson | G06F 21/34 726/9 |
| 2012/0260318 A1* | 10/2012 | Fromentoux | H04L 63/0807 726/4 |
| 2013/0047195 A1* | 2/2013 | Radhakrishnan | G06F 21/335 726/1 |
| 2013/0047202 A1* | 2/2013 | Radhakrishnan | G06F 21/32 726/1 |
| 2013/0047266 A1* | 2/2013 | Radhakrishnan | H04L 63/0807 726/28 |
| 2013/0171971 A1 | 7/2013 | Fujii et al. | |
| 2013/0252583 A1* | 9/2013 | Brown | H04W 12/06 455/411 |
| 2015/0200948 A1* | 7/2015 | Cairns | G06F 21/44 726/4 |

FOREIGN PATENT DOCUMENTS

| | | |
|---|---|---|
| EP | 1271436 B1 | 5/2007 |
| EP | 1504424 B1 | 9/2008 |
| WO | 2004029819 A1 | 4/2004 |
| WO | 2008121576 A4 | 10/2008 |
| WO | 2009087006 A1 | 7/2009 |

OTHER PUBLICATIONS

Djenouri, Djamel; Khelladi, Lyes; Badache, Nadjib. A Survey of Security Issues in Mobile Ad Hoc and Sensor Networks. IEEE Communications Surveys & Tutorials. vol. 7, Issue: 4. Pub. Date: 2005. http://ieeexplore.ieee.org/stamp/stamp.jsp?arnumber=1593277.*

French Search Report and Written Opinion dated Aug. 28, 2014 for corresponding French Application No. 1362496, filed Dec. 12, 2013.

English translation of the French Written Opinion dated Aug. 28, 2014 for corresponding French Application No. 1362496, filed Dec. 12, 2013.

* cited by examiner

METHOD OF AUTHENTICATION BY TOKEN

TECHNICAL FIELD

The present disclosure refers to the field of authentication for accessing a service and relates more particularly to a system for jointly authenticating a user and a terminal for multimedia content retrieval.

PRIOR ART

The huge influx of connected terminals is currently revolutionizing the consumption of audiovisual content. Most of the connected multimedia devices, such as, for example, connected TVs, games consoles, personal computers, tablets and smartphones, provide access to online content. Users can thus retrieve their content from different terminals, but also from different access networks (home network, Wi-Fi hotspots, a third-party operator's mobile telephony network, etc.). A tablet, for example, provides access to many environments for content consumption from any Wi-Fi access point. The content services proposed by the market players are evolving in order to take advantage of these new uses.

If the facility to retrieve his content from different terminals and from different access points offers an obvious advantage to the customer, it is accompanied by new requirements imposed by the stakeholders. With a view to maintaining the value of their content, they impose requirements to limit the sharing of a subscription or purchase within the same household. These requirements must allow the retrieval of content from a plurality of terminals while ensuring that only users who have subscribed can actually consume the content. A limit is often fixed at a maximum of 5 different terminals per household, with a maximum of one terminal addition/removal per month.

Today, in order to meet the requirements of the stakeholders, the OTT (Over The Top) players generally maintain a list of authorized terminals for a user or household. An authorization is granted on the basis of a unique identifier of the terminal, such as, for example, a MAC (Media Access Control) address. Users can thus add or remove terminals from the list of authorized terminals, for example following the loss of one of their terminals or in the event of acquiring a new device. Access to this list is generally protected by a simple password. Given that said password can easily be shared with persons outside the household, the stakeholders can have no guarantee that the sharing of the subscription is limited to its members alone. In fact, no link exists between the household and the registered terminals. It can also be noted that the management of the authorizations by the user is an impediment to a seamless and efficient experience, and that it requires the implementation of complex systems and a costly support chain on the part of the service operators.

The application US 20080242264 A1 proposes a system for authenticating a terminal according to a network access type in the context of a service registration, based, on the one hand, on a hardware identifier of the terminal and, on the other hand, on a network access method. However, the system does not propose any checking of the rights associated with the access owner, nor any solution regarding the limitation of the number of terminals authorized to access a content service, nor regarding the limitation of the number of terminal additions/removals over a given period, and is not therefore useful for meeting the new requirements of the stakeholders in connection with content retrieval on different terminals.

A need therefore exists to secure the access to digital content by identifying a terminal jointly with a user, in such a way as to guarantee that only users who are members of the same household can access the content from a certain number of declared terminals.

SUMMARY

A first aspect of the present disclosure proposes a method of authentication by token for accessing a service from a terminal, such that it comprises, on receipt of a service access authorization request, including at least one unique identifier of the terminal, steps of determining a network access context of the terminal; checking the validity of the service access rights, comprising at least checking an access right associated with the network access context of the terminal; and, if the access rights are valid, a step of generating a valid authentication token on the basis of the unique identifier of the terminal and the network access context, and transmitting the token to the terminal.

The term "digital content" is to be understood in the description below to mean any type of digital data corresponding to a content or a set of contents which can be transmitted in a network considered in the form of a data stream. This may notably involve data relating to a document, or image, sound or video data, or, in a general manner, multimedia data.

The term "token" is understood here to mean a datum which allows a terminal which holds it to access a network device which is capable of validating this token. Its use allows the access to a network to be secured by certifying the validity of an access request. No limitation is attached to the type of a token. Here, it is associated with a unique identifier and can therefore correspond, for example, to a signature of the unique identifier with which it is associated or to an encryption of this identifier. It must be noted here that the token is generated in such a way that it is impossible to infer the unique identifier from the token. On the other hand, it is possible to show that a token has in fact been generated on the basis of a given unique identifier. Once generated, the token can be supplied to the terminal with which it is associated in order that the latter can supply it as proof of authentication in subsequent requests.

In the context of the present application, the unique identifier of a terminal is an identifier of the terminal obtained, for example, from physical elements that make it up. For example, a MAC (Media Access Control) address is a physical identifier stored in a network interface which can be used as a unique identifier of a terminal. Many other identifiers can be used to implement the various aspect of the present disclosure, such as, for example, the serial number of a motherboard. A unique identifier may also correspond to a software identifier stored in a memory or obtained by running an algorithm dedicated to the terminal. Generally speaking, any identifier allowing the terminal to be identified in an unambiguous manner can be used as a unique identifier of this terminal.

In the description below, the term "network access context" designates information relating to the access network used by the terminal to connect to the network. In particular, the network access context information allows an operator to distinguish an access on the basis of which it is possible to identify a user or group of users implicitly, such as, for example, a residential access, a mobile access or a Wi-Fi access with identification by means of a SIM (Subscriber Identity Module) card, a roaming access on the basis of which the identity of the user cannot be implicitly inferred, such as a public Wi-Fi access point or a third-party operator's network, for example. For example, the "network access context" information allows an access to a service from a residential Internet connection to be distinguished from an access to this same service from a public Internet connection. This datum can be obtained, for example, from the IP (Internet Protocol) address allocated by an operator, or during the phase of registering the terminal with a network, or from information contained in a SIM card or, more generally, from any means allowing a user or group of users to be implicitly identified by the network access used.

Thus, according to an example of the first aspect of the present disclosure, it is possible to identify jointly and implicitly a terminal and a user or group of users in order to generate an authentication token authorizing access to a service from a terminal. It should be noted that, since the token has been generated in a manner associated with the unique identifier of the terminal, it can be used only by the latter. In fact, in subsequent request to access the service, the terminal must supply its unique identifier and its token. It is therefore possible for an entity responsible for validating the token to check the consistency of the token with the unique identifier supplied in the request. This provides a guarantee regarding the possibility of a fraudulent practice which would consist in seizing a token generated for one terminal in order to reuse it from a different terminal. On the other hand, an additional security is provided by the fact that the token can be generated only when a terminal uses a network access from which the user is identified implicitly, for example by a component of the operator's network. The method then provides the double guarantee that only a user or group of users having rights to access a service can actually access said service, and can access said service only from a terminal used to generate the token.

According to a second aspect of the present disclosure, the method is such that it furthermore comprises, during the determination of the validity of the service access rights, steps of determining a number of valid tokens associated with the network access context, comparing the number of tokens associated with the network access context with a predetermined maximum number of tokens, and determining the validity of the rights according to the result of the comparison.

An aspect of the disclosure thus proposes to check the number of tokens generated for a given network access context in such a way as to limit, for example, the number of terminals from which it is possible for a user or group of users to access a service. For a user to be able to obtain a valid authentication token allowing access to the service from a new terminal, it is then necessary for a new token to be generated for this terminal, on the basis of the corresponding unique identifier, for the user to access the service from his own network access and for the number of valid tokens associated with this network access to be lower than a predetermined maximum threshold.

According to one particular embodiment, the method is such that it furthermore comprises, during the checking of the validity of the service access rights and when the number of valid tokens associated with the network access context is higher than the predetermined maximum number of tokens, a step of revoking at least one valid token.

A new terminal can therefore always obtain a service access token which is associated with its unique identifier if it uses an authorized access. In fact, when the maximum number of tokens associated with a network access context is reached and it is nevertheless necessary to generate a token for a new terminal, a valid token can be revoked. Thus, the maximum number of tokens associated with the network access context is never exceeded. The choice of token to be revoked can be made according to different criteria. For example, an authentication server can record the number of uses of the tokens in such a way as to revoke the token least often used. The choice can also relate to the oldest token according to a FIFO (First In First Out) logic, or, for example, to the token corresponding to the oldest date of use. When the type of terminal for which the tokens are generated is known, other criteria can be applied in such a way as to prioritize certain terminal types or categories. Thus, for example, it may not be possible to revoke a token associated with a particular terminal type. It is also possible to challenge the user on the terminal to be revoked.

According to a different embodiment, the method is such that, when the number of revocations in a predetermined time window is higher than a predetermined threshold, the token revocation step is not carried out and the service access rights for the terminal are invalidated.

The method thus allows the frequency with which a user can access the service from a terminal not having a valid token to be limited when the maximum number of tokens has been generated for a given access context. The entity responsible for generating the token, for example an authentication server, can store the generation date of each of the tokens generated for a particular access context. The entity can then record the number of tokens that have been generated during a given period, for example during the 4 weeks preceding a request to generate a token for a new terminal, and can thus determine whether the generation of the new token is authorized or not. When the generation is authorized, a valid token is revoked in such a way that the maximum number of tokens associated with the network access context is not exceeded.

According to a different embodiment, the method is such that, on receipt of a service access request comprising a first unique identifier of the terminal and an authentication token associated with a second unique identifier of the terminal, the method furthermore comprises steps of comparing the first and second unique identifiers of the terminal, determining the validity of the token according to the result of the comparison and authorizing access to the service requested if the token is valid.

When a token has been indicated to a terminal following the receipt, by an authentication entity implementing an aspect of the present disclosure, of a service access request originating from this terminal and not having an authentication token, the terminal can use this token in addition to its unique identifier in its subsequent requests. When such a request is received, an entity implementing an aspect of the present disclosure can then check the validity of the token indicated by the terminal. For this purpose, the authentication entity can check that the unique identifier of the terminal in fact corresponds to the identifier used to generate the token, in such a way as to thwart an attempted fraud which would consist in using this same token from a terminal not having such a token. If there is correspondence between the unique identifier contained in the request and the identifier used to generate the token, the token is considered as valid and the service access authorization can be granted to the terminal. It can be noted that, when a valid token is indicated in a request originating from an authorized terminal, it is not necessary for the access to the service to take place from a particular network access. Thus, when a user equipped with a new terminal accesses the service for a first time from a network access allowing an implicit authentication, for example from his home, from a mobile network or from a Wi-Fi network with an authentication based on a SIM card, he can access the service subsequently from any network access, including public access points or via a third-party operator's cellular network.

According to a different embodiment, the method is such that the determination of the validity of the token furthermore includes a check that the token generation date is within a predetermined time window.

It is thus possible to impose a time limit on the validity of a token. For example, an authentication entity implementing an aspect of the present disclosure may provide for a token to have a validity period of 2 months as from its generation date. The generation date may also correspond to a regeneration date when the token is updated following a connection from an access point allowing an implicit authentication by the network, i.e. when the network access context information allows the validation of the access right. When it receives a service access request originating from a terminal, the authentication entity can check that the generation date of this token is in fact within the two-month period preceding the receipt of the token, and can revoke it when the validity period has expired. A user must then obtain a new token for the terminal by formulating a request for access from an authorized network access, such as, for example, the network access of his home. In this way, the method guarantees that only users who regularly frequent an authorized access point, for example the members of a household having Internet access, can access the service. The method then limits a fraudulent practice which would consist in granting authorizations to access a service from terminals belonging to third parties.

In a different embodiment, the method is such that it furthermore comprises, during the determination of the validity of the token, steps of comparing a number of granted authorizations included in the token and a number of granted authorizations associated with the token, determining the validity of the token according to the result of the comparison and, if the token is valid, updating the number of granted authorizations associated with the token, updating the number of granted authorizations included in the token, and transmitting the updated token to the terminal.

A token usage counter is thus maintained on the authentication entity and in the token itself. When a token has been validated, the counter included in the token and the counter maintained by the authentication entity are incremented. For a token to be considered valid, the counter included in the token and the counter associated with it on the authentication entity must indicate the same number of uses. In this way, an exemplary embodiment of the method can guarantee that a token will be able to be used only once with each update and prevents certain attacks which would consist in seizing a request to access the service including a token and an associated unique terminal identifier in order to reissue it from an unauthorized terminal.

According to one particular embodiment, the method is such that the step of determining a network access context of the terminal comprises a step of identifying an owner associated with the network access used by the terminal.

The owner associated with the network access can, for example, be identified by carrying out a search in a database on the basis of the IP (Internet Protocol) address allocated to the terminal when it is connected to the network. It is then possible to determine, for example, the services subscribed to by the access owner in order to determine the access rights thereof. This access-based identification offers a guarantee regarding the identity of the user, and simplifies the usage from the point of view of the user who has no identifier to input in order to be connected.

An aspect of the present disclosure also relates to a device for authentication by token such that it comprises at least one module for receiving a service access authorization request including at least one unique identifier of the terminal, a module for determining a network access context of the terminal, a module for checking the validity of the service access rights, a module for generating a valid authentication token on the basis of the unique identifier of the terminal and the network access context, and a module for transmitting the token to the terminal.

An aspect of the present disclosure also relates to an authentication server including a device for authentication by token as described above.

An aspect of the present disclosure also relates to a computer program comprising the instructions for carrying out the method of authentication by token as described above, when the program is executed by a processor.

Finally, an aspect of the present disclosure relates to a computer-readable information medium on which a computer program is recorded, including instructions for carrying out the steps of the method of authentication by token as described above.

The information medium may be any given entity or device capable of storing the program. For example, the medium may comprise a storage means, such as a ROM, for example a CD-ROM or microelectronic circuit ROM, or a magnetic recording means, for example a diskette (floppy disk) or hard disk. Moreover, the information medium may be a transmissible medium such as an electrical or optical signal which can be routed via an electrical or optical cable, by radio or by other means. The program according to the present disclosure may, in particular, be downloaded from an Internet network. Alternatively, the information medium may be an integrated circuit into which the program is incorporated, the circuit being suitable for carrying out or for being used in the carrying out of the method in question.

A different aspect of the present disclosure relates to a service access method such that it comprises steps of obtaining a unique identifier of the terminal; transmitting a service access request including the unique identifier; receiving an authentication token generated on the basis of the unique identifier of the terminal and a network access context, when the service access request is transmitted from an authorized network access, and transmitting a service access request including the unique identifier of the terminal and the authentication token.

A different aspect of the present disclosure relates to a communication terminal having a unique identifier, characterized in that it comprises a communication unit suitable for transmitting a service access request including the unique identifier, receiving an authentication token generated on the basis of the unique identifier of the terminal and a network access context, when the service access request is transmitted from an authorized network access, and transmitting a service access request including the unique identifier of the terminal and the authentication token.

The servers, devices and programs offer advantages similar to those of the corresponding method described above.

DESCRIPTION OF THE FIGURES

Other characteristics and advantages will become clearer from a reading of the following description of a particular embodiment, given by way of a simple, illustrative and non-limiting example, and the attached drawings, in which.

DESCRIPTION OF A PARTICULAR EMBODIMENT

Figure 1A:
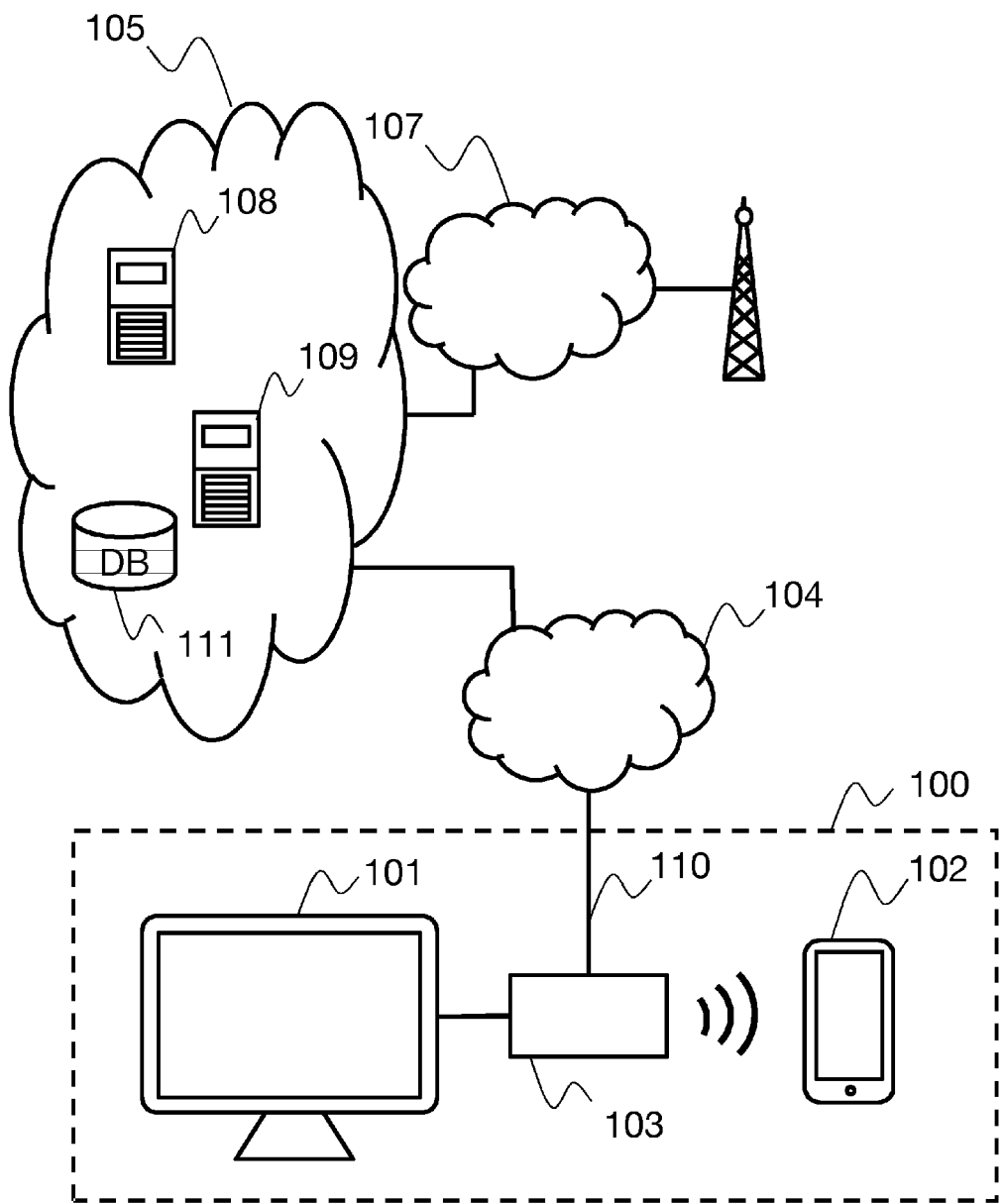
FIGS. 1a and 1b show a general architecture suitable for carrying out the method for identification by token for accessing a service from a terminal, according to one particular embodiment.

FIG. 1a shows a general architecture suitable for carrying out a method of authentication by token according to one embodiment; however, it will be obvious to the person skilled in the art that additional components may be present or that some components can be combined in the same entity or, conversely, can be distributed among a plurality of entities. A home environment 100 includes a connected television 101 and a mobile terminal 102, such as, for example, a smartphone, suitable for retrieving audiovisual content broadcast over a communication network 105 by a content provider 108. The home environment comprises an access point 103, for example an ADSL router/modem to which the television and the mobile terminal are connected via a local network, for example an Ethernet or Wi-Fi network. The access point 103 enables the connection of the television and the mobile terminal to the telecommunication network 105 via a network access 110 and an access network 104. The communication network comprises an authentication server 109 suitable for carrying out the method. In particular, the authentication server 109 authorizes or does not authorize the retrieval of the digital content broadcast by the content provider 108 and can access a database 111. It must be noted that this environment is given by way of example and that the authentication server 109 and the content provider may belong entirely to different interconnected networks, for example.

Figure 1B:
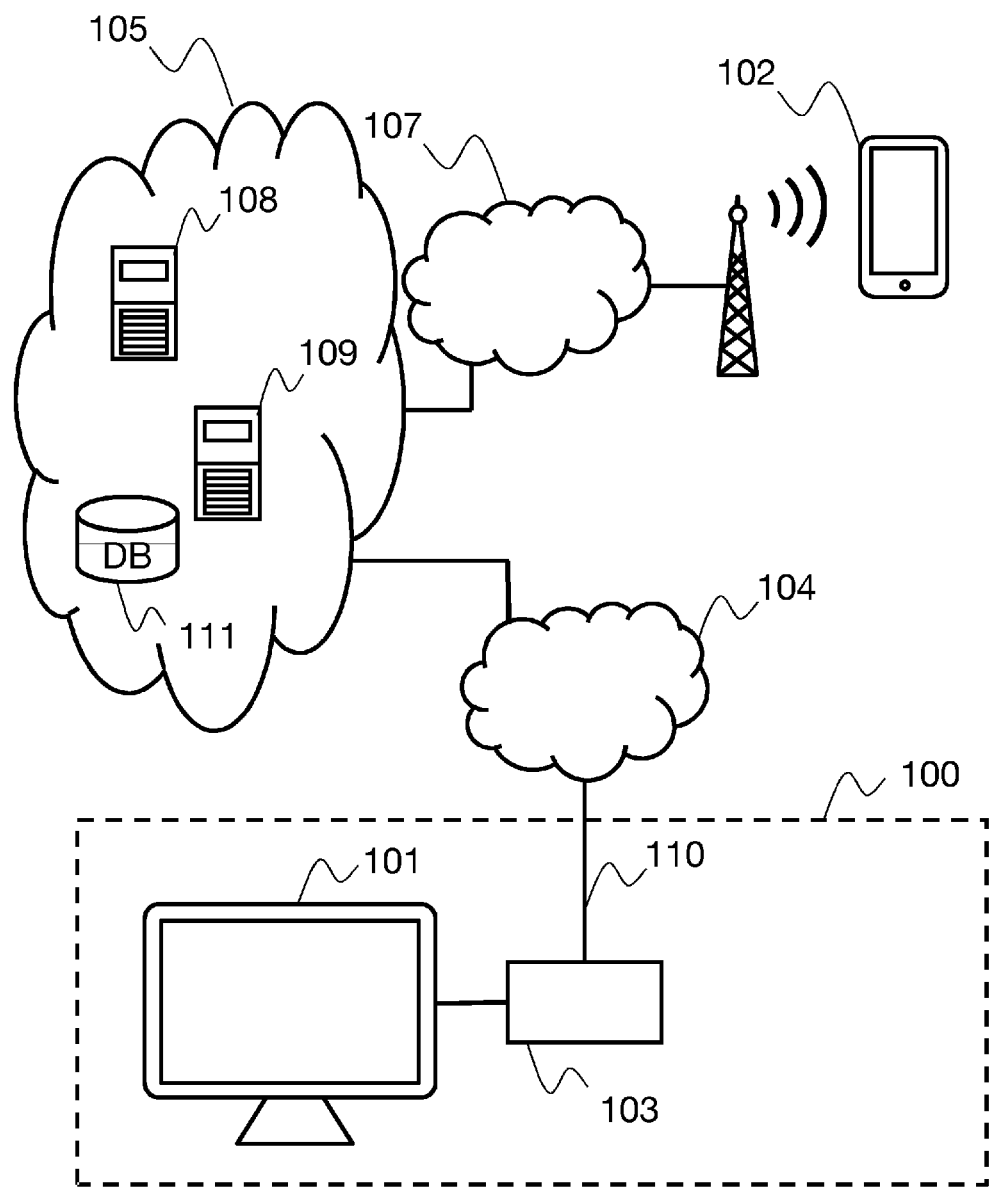
Figure 2:
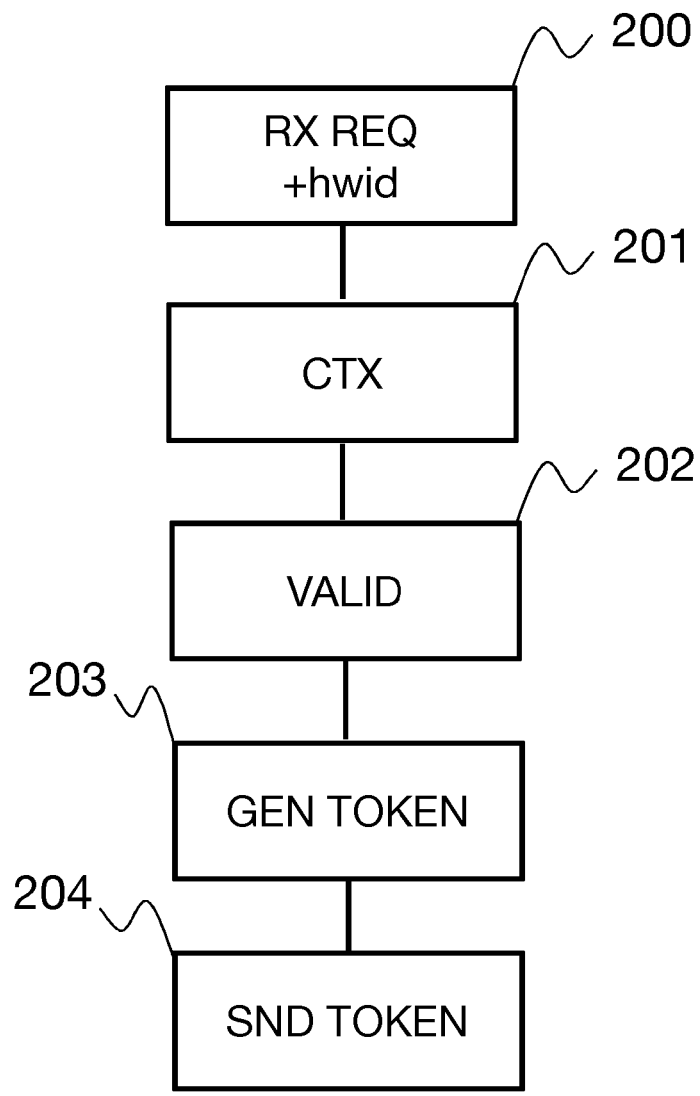
FIG. 2 shows the main steps of the method of authentication by token for accessing a service when a request is received comprising a unique identifier of the terminal, according to one embodiment.

FIG. 1b shows the same environment in which the mobile terminal 102 is in a roaming situation, connected to the telecommunication network 105 via a wireless access network 107, for example a public Wi-Fi access point or a third-party operator's cellular network. It will be assumed in the description below that the owner of the network access 110 has taken out a subscription to retrieve digital content broadcast by the content provider 108. FIG. 2 shows the main steps of the method of authentication by token according to one particular embodiment.

A terminal of the home environment, for example the television 101, may submit a request to retrieve digital content available from the content provider 108. To do this, the terminal transmits a service access request to the authentication server 109. The request may, for example, be transmitted according to the HTTP protocol (HyperText Transfer Protocol) and passes through the access point 103 and the access network 104 before reaching the telecommunication network 105.

The service access request includes at least one unique identifier of the terminal. This identifier is a unique identifier of the terminal, obtained, for example, from certain physical elements that make it up. It may, for example, be a MAC (Media Access Control) address, the serial number of a hardware component or a combination of serial numbers of different components of the terminal. Generally speaking, any identifier obtained or generated from hardware characteristics and/or reliably and unambiguously identifying the terminal can be used.

The authentication server 109 receives the service access request including a unique identifier of the terminal during a step 200.

According to a step 201, the authentication server determines the network access context of the terminal which has transmitted the request. To do this, the server may, for example, analyze the received request in order to determine the source IP address of the request, i.e. the public address allocated to the access point 103 used by the terminal to transmit this request. The Internet access providers generally store the associations between the allocated IP addresses and the associated owners in a database. On the basis of this IP address, the server can interrogate a database 111 in order to obtain the type of network access used and infer the network access context of the terminal therefrom. The server may, for example, determine whether the request has been transmitted from a residential access, such as, for example, the access 110 shown in FIG. 1a, or from a roaming access, such as, for example, from the network 107 shown in FIG. 1b, or from a public or institutional access.

The authentication server may then, during a step 202, check the rights to access the service from the terminal. In particular, the method proposes to check whether the service access requested by the terminal is authorized according to the network access context determined during the preceding step. For example, the authentication server may interrogate a database of the content provider in order to check whether the owner of the access used has in fact subscribed to the requested service. According to the terms and conditions of the service subscription, it may also decide, for example, to grant the service access according to the type of access network used to transmit the request.

In step 203, if the access rights have in fact been validated, the authentication server can generate a token associated with the unique identifier of the terminal and the network access context.

Conversely, when the service access rights are not valid, an error can be returned to the terminal. This may entail, for example, an error code accompanied or not by an explanatory message enabling the terminal to inform the user of the reasons for refusing the service access request.

According to one particular embodiment, a maximum number of tokens can be associated with a given network access context. To do this, the server can store an association between the token and the network access context, for example in a database 111 or in a file stored on the server, in order to create and retain a record of the tokens generated for a given network access context. It is thus possible to check the number of tokens associated with the network context and invalidate the service access rights in step 202 when a maximum number of valid tokens is reached. In an exemplary embodiment, the method thus limits the number of terminals from which content retrieval is authorized.

Alternatively, the server can also revoke a previously generated token when the generation of a token is requested, but the maximum number of tokens associated with an access is reached. The revocation of the token may consist in a removal of its reference from a database, for example the database 111, enabling the tokens to be recorded, or in a marking of the token as invalid in the database, for example. The number of terminals authorized to retrieve the content thus remains constant. The choice of token to be revoked can be made according to different criteria. For example, the server can choose to revoke the least used token or the oldest token. The choice of a token to be revoked can also be made according to the type of terminal with which it is associated, in such a way that, for example, tokens associated with certain devices cannot be revoked, such as, for example, a fixed device such as a connected television or set top box from which the digital content retrieval may always have to be possible.

The token generated in step 203 can thus be obtained from a set of information which may include all or some of the following elements:
identifier of the terminal;
identifier of the network access context.

An imprint of this set of information or a subset of this information (or application of a hash function to this set of information) can then be calculated by implementing a predetermined algorithm. This imprint can then be encrypted by means of a key in order to obtain the token. The predetermined algorithm may, for example, be an SHA-1 algorithm, standing for "Secure Hash Algorithm".

Alternatively, it is also possible to carry out a method combining a calculation of the imprint by means of a cryptographic algorithm and the use of a secret key, such as HMAC, standing for "Hash-based Message Authentication Code".

When a token has been generated, it is indicated to the terminal in step 204. For example, the token may be included in the response to the service access request transmitted by the television 101 shown in FIGS. 1a and 1b. In this way, the television obtains a service access token which it can include in its content access requests in order to prove the validity of its access right.

The home environment 100 shown in FIG. 1a also includes a mobile terminal 102. This terminal is connected to the telecommunication network 105 via the residential access point 103, and, in the same way as the television 101, can access the digital content broadcast by the provider 108. During the first request to access the service of the provider 108 transmitted by the terminal 102, the previously described steps of the method apply and the terminal obtains a token generated on the basis of the network access context and the unique identifier characterizing the terminal. The authentication server 109 for its part holds the tokens associated with the network access context in a memory, for example in the database 111.

The same mobile terminal 102, this time shown in FIG. 1b, will now be considered. This terminal has a service access token supplied during a retrieval from the home environment and is now in a roaming situation, connected to the telecommunication network 105 via a roaming access network 107, such as, for example, a Wi-Fi access point or a third-party operator's cellular network. The terminal 102 can transmit a service access request to the authentication server, including its unique identifier and the token previously obtained from the network access 110 of the home environment.

Figure 3:
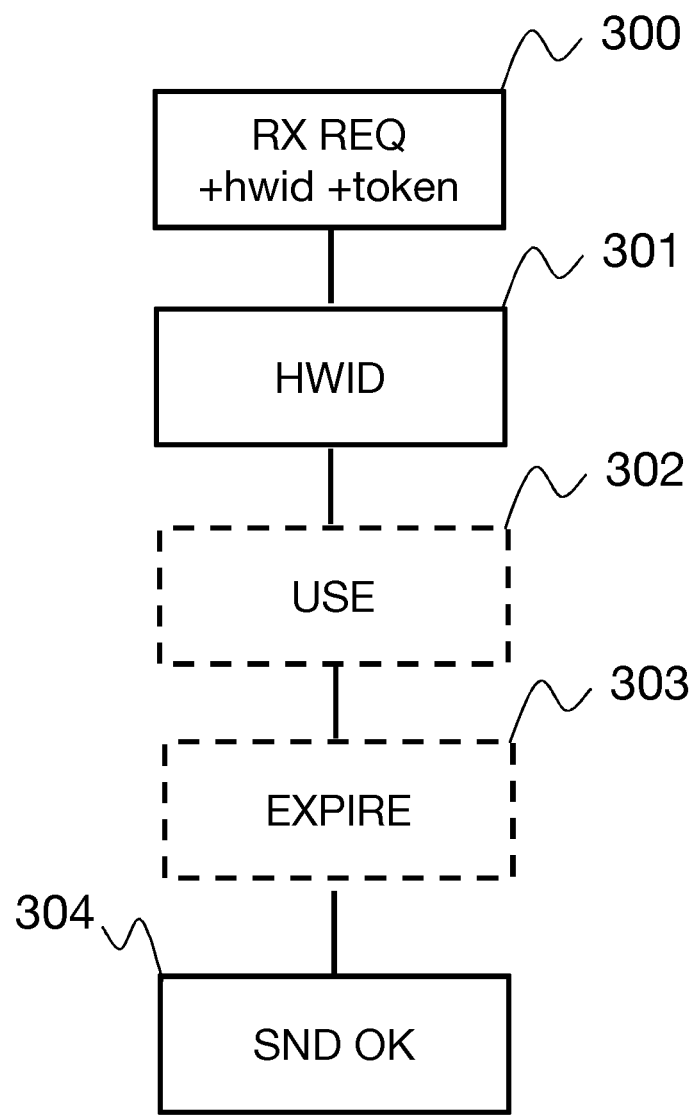
FIG. 3 shows the main steps of the method of authentication by token for accessing a service when a request is received comprising a token and a unique identifier of the terminal, according to one embodiment.

A request of this type is received by the authentication server 109 during a step 300 shown in FIG. 3. During this step, the server can decrypt the token by means of the key used for the encryption in such a way as to obtain the imprint implemented on the basis of the information used during the generation of the token, in particular the unique identifier and, for example, the network access context.

FIG. 3 shows the steps of the method on receipt of a service access request including a unique identifier of the terminal requesting an access and a token as generated in step 203 of the method. A request of this type can be transmitted by a terminal which has obtained a token following a service access request transmitted from an authorized network access. This may entail, for example, the residential Internet access 110 shown in FIGS. 1a and 1b, for example. On receipt of a request of this type, the method proposes to decrypt the token by means of the key used during the encryption in order to check its validity.

For this purpose, the authentication server can, during a step 301, compare the unique identifier supplied by the terminal in the request with the unique identifier obtained from the decrypting of the token. If the two identifiers match one another and the token is not marked as revoked in the database 111, the terminal can be authorized to retrieve the requested content.

In step 302, according to one particular embodiment, the method proposes to carry out an additional check in such a way as to detect a possible fraudulent practice which would consist in seizing an access authorization request sent by an authorized terminal in order to reissue it from an unauthorized terminal from which access to the service would nevertheless be sought. In order to avoid such a "replay" of the request, the method proposes to record the number of uses of the token and simultaneously store the value thereof on the authentication server or in the database 111 and in the token itself in such a way that, each time the token is validated by the authentication server, the two counters are incremented. Following the incrementing of the token counter, the token thus modified is indicated to the terminal. In this way, during the presentation of the token for validation, the authentication server can compare the value of the two counters and establish the validity of the token when the counters have identical values.

In order to avoid another fraudulent practice which would consist in granting an access authorization from a terminal to a third party who has not subscribed to the service, the method proposes to check the validity period of the token during a step 303. According to this particular embodiment, a validity end date can be associated with the token when it is generated. This date may, for example, be stored in the token itself or in the database 111, in correspondence with the token. During the token validity check, if the expiry date is exceeded, the token can be revoked. During a service access request transmitted by a terminal from an authorized network access, such as, for example, the access 110 of the home environment 100 shown in FIGS. 1a and 1b, the expiry date of the token can be renewed.

Finally, a service access can be granted in step 304 when the token has been validated. To do this, the authentication server can send a response to the terminal comprising, for example, a URL to access the requested service, or any other means for linking with the required content provider. The token may furthermore be indicated again to the terminal, in particular if it has been modified in steps 302 or 303, in such a way that the terminal can present the modified token when subsequent requests are sent.

Thus, according to one particular embodiment, the token generated in step 203 can be obtained from a set of information which may include all or some of the following elements:
identifier of the terminal;
identifier of the network access context;
validity period of the token;
token usage counter.

Figure 4:
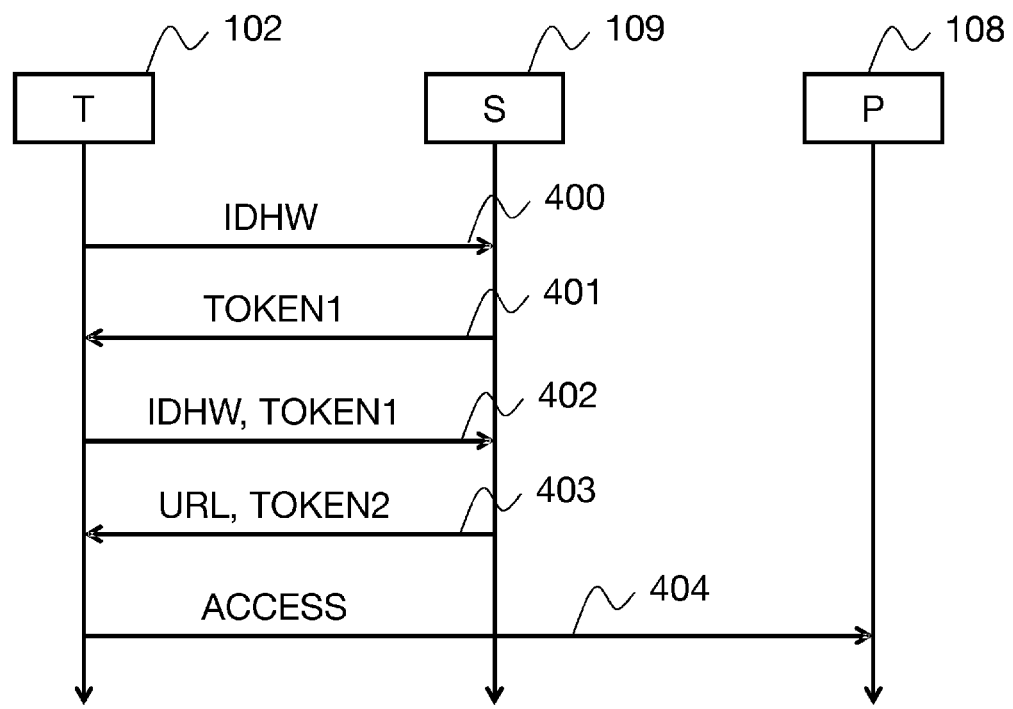
FIG. 4 is a timing chart showing the messages exchanged between a terminal and an authentication server carrying out the method of authentication by token according to one particular embodiment.

FIG. 4 shows messages that can be exchanged between a terminal 102, a digital content provider 108 and an authentication server 109 carrying out the method of authentication by token according to one particular embodiment.

A first service access request 400 including a unique identifier (IDHW) can be sent from the terminal 102 which does not have a token to the authentication server 109. This may entail, for example, an http request comprising the identifier of the terminal in an http header field, for example. During step 204, described with reference to FIG. 2, a message 401 comprising a token (TOKEN1) is sent to the terminal. This message may correspond to a response to the http request 400 in which the token can be indicated to the terminal by means of an http cookie or a dedicated field in the body or header of the response.

When it has a token, the terminal 102 can transmit a service access request 402 including a unique identifier (IDHW) and the token (TOKEN1) obtained via the message 401. This may also entail, for example, an http request. In step 304, described with reference to FIG. 3, the server 109 can send a response message 403 comprising, for example, a URL to access the content provider and the token, possibly updated (TOKEN2).

Finally, the terminal can access the content provider 108 by means of a message 404 and the URL supplied in the response 403. According to one particular embodiment in which the content provider is able to validate the token according to the steps of the method, the service access request 402 can be transmitted directly to the content provider. According to a different embodiment, the access can also be obtained via a direct link between the authentication server and the content provider.

Figure 5:
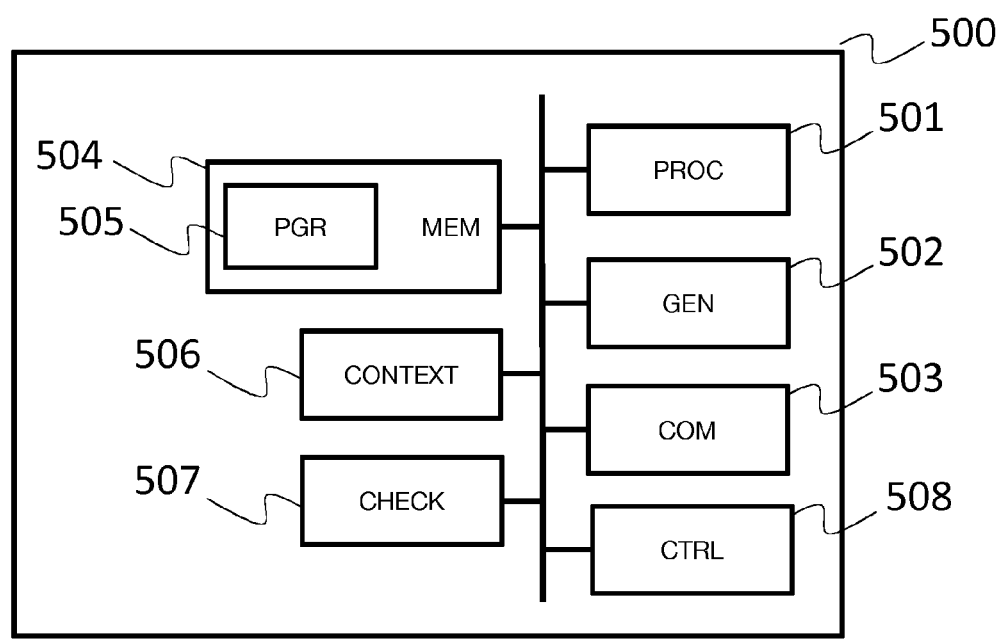
FIG. 5 shows the architecture of a device carrying out the method of authentication by token according to one particular embodiment.

FIG. 5 shows the architecture of a device for authentication by token 500 carrying out the method of authentication by token according to one embodiment. The device includes a storage space 504, for example a memory MEM, and a processing unit 501 equipped, for example, with a processor PROC. The processing unit can be controlled by a program 505, for example a computer program PGR, carrying out the method of authentication by token as described with reference to FIGS. 2 and 3, and notably the steps of determining a network access context of a terminal (201), checking the validity of the service access rights, comprising at least checking an access right associated with the network access context of the terminal (202), generating a valid authentication token on the basis of the unique identifier of the terminal and the network access context (203), transmitting the token to the terminal (204) and checking the validity of a token (301, 302, 303).

On initialization, the computer program instructions 505 are, for example, loaded into a RAM (Random Access Memory) memory before being executed by the processor of the processing unit 501. The processor of the processing unit 501 carries out the steps of the method according to the computer program instructions 505.

To do this, the device includes, as well as the memory 504, means for determining a network access context 506 on the basis of a service access authorization request, checking the validity of the service access rights 507, generating a valid token 502 on the basis of a unique identifier and a network context and checking the validity of a token 508. The device furthermore includes communication means 503, such as, for example, a network interface, suitable for sending and receiving messages, and, in particular, for receiving service access requests and sending corresponding responses.

According to one embodiment, the device can be integrated into a server device.

Although the present disclosure has been described with reference to one or more examples, workers skilled in the art will recognize that changes may be made in form and detail without departing from the scope of the disclosure and/or the appended claims.

What is claimed is:

1. A method of authentication by token for accessing a service from a terminal, wherein the method comprises, on receipt of a service access authorization request including at least one unique identifier of the terminal, the following acts:
determining an access network context of the terminal, said access network context referring to a datum relating to the access network used by the terminal, the datum being suitable for identifying a user associated with the access to that access network,
checking validity of the service access rights, comprising at least:
checking an access right associated with the access network context of the terminal,
determining a number of valid tokens simultaneously associated with the access network context,
comparing the number of tokens simultaneously associated with the access network context with a predetermined maximum number of tokens, said maximum number of tokens being greater than one, and
determining the validity of the rights according to the result of the comparison,
after checking the validity, if said access rights are valid:
generating a valid authentication token on the basis of the unique identifier of the terminal and the access network context, and
transmitting the token to the terminal.

2. The method according to claim 1, wherein the method furthermore comprises, during the checking of the validity of the service access rights and when the number of valid tokens associated with the access network context exceeds the predetermined maximum number of tokens, an act of revoking at least one valid token.

3. The method according to claim 2, wherein, when the number of revocations in a predetermined time window exceeds a predetermined threshold:
the token revocation act is not carried out, and
the service access rights for the terminal are invalidated.

4. The method according to claim 1, wherein, on receipt of a service access request comprising a first unique identifier of the terminal and an authentication token associated with a second unique identifier of the terminal, the method furthermore comprises the following acts:
comparing the first and the second unique identifiers of the terminal,
determining the validity of the token according to the result of the comparison, and
authorizing access to the requested service if the token is valid.

5. The method according to claim 4, wherein the determination of the validity of the token furthermore includes a check that a date at which the token was generated is within a predetermined time window.

6. The method according to claim 4, wherein the method furthermore comprises, during the determination of the validity of the token, the following acts:
comparing a number of granted authorizations included in the token and a number of granted authorizations associated with the token,
determining the validity of the token according to the result of the comparison, and
if the token is valid:
updating the number of granted authorizations associated with the token,
updating the number of granted authorizations included in the token, and
transmitting the updated token to the terminal.

7. The method according to claim 1, wherein the act of determining the access network context of the terminal comprises an act of identifying an owner of the access network used by the terminal.

8. An apparatus comprising a device for authentication by token for accessing a service from a terminal, wherein the device comprises:
means for receiving a service access authorization request including at least one unique identifier of the terminal,
means for determining an access network context of the terminal,
means for checking validity of the service access rights, comprising at least:
checking an access right associated with the access network context of the terminal,
determining a number of valid tokens simultaneously associated with the access network context,
comparing the number of tokens simultaneously associated with the access network context with a predetermined maximum number of tokens, said maximum number of tokens being greater than one, and
determining the validity of the rights according to the result of the comparison,
means for generating a valid authentication token on the basis of the unique identifier of the terminal and the access network context, after checking the validity, and
means for transmitting the token to the terminal.

9. The apparatus according to claim 8, wherein the apparatus constitutes a server comprising the device.

10. A non-transitory computer-readable information medium on which a computer program is recorded, including instructions for carrying out a method of authentication by token for accessing a service from a terminal, when the instructions are executed by a processor, wherein the method comprises, on receipt of a service access authorization request including at least one unique identifier of the terminal, the following acts:
determining an access network context of the terminal, said access context referring to a datum relating to the access network used by the terminal, the datum being suitable for identifying a user associated with the access,
checking validity of the service access rights, comprising at least:
checking an access right associated with the access network context of the terminal,
determining a number of valid tokens simultaneously associated with the access network context,
comparing the number of tokens simultaneously associated with the access network context with a predetermined maximum number of tokens, said maximum number of tokens being greater than one, and
determining the validity of the rights according to the result of the comparison,
after checking the validity, if said access rights are valid:
generating a valid authentication token on the basis of the unique identifier of the terminal and the access network context, and
transmitting the token to the terminal.

11. A method for accessing a service from a terminal, wherein the method comprises the following acts:
obtaining a unique identifier of the terminal,
transmitting a service access request including the unique identifier,
receiving an authentication token generated on the basis of the unique identifier of the terminal and an access network context, when the service access request is transmitted from an authorized network access, said access network context referring to a datum relating to the access network used by the terminal, the datum being suitable for identifying a user associated with the access, said token being generated if the number of tokens associated with the access network context does not exceed a predetermined maximum number of tokens, said maximum number of tokens being greater than one, and
transmitting a service access request including the unique identifier of the terminal and the authentication token.

12. A communication terminal having a unique identifier, wherein the terminal comprises:
a communication unit configured to:
transmit a service access request including the unique identifier,
receive an authentication token generated on the basis of the unique identifier of the terminal and an access network context, when the service access request is transmitted from an authorized network access, said access network context referring to a datum relating to the access network used by the terminal, the datum being suitable for identifying a user associated with the access, said token being generated if the number of tokens associated with the access network context does not exceed a predetermined maximum number of tokens, said maximum number of tokens being greater than one, and
transmit a service access request including the unique identifier of the terminal and the authentication token.

* * * * *